Sept. 21, 1965 V. D'ERRICO 3,207,833
METHOD AND APPARATUS FOR MOLDING A HEADPIECE TO A PREFORMED
TUBULAR BODY
Filed Nov. 23, 1962 2 Sheets-Sheet 2
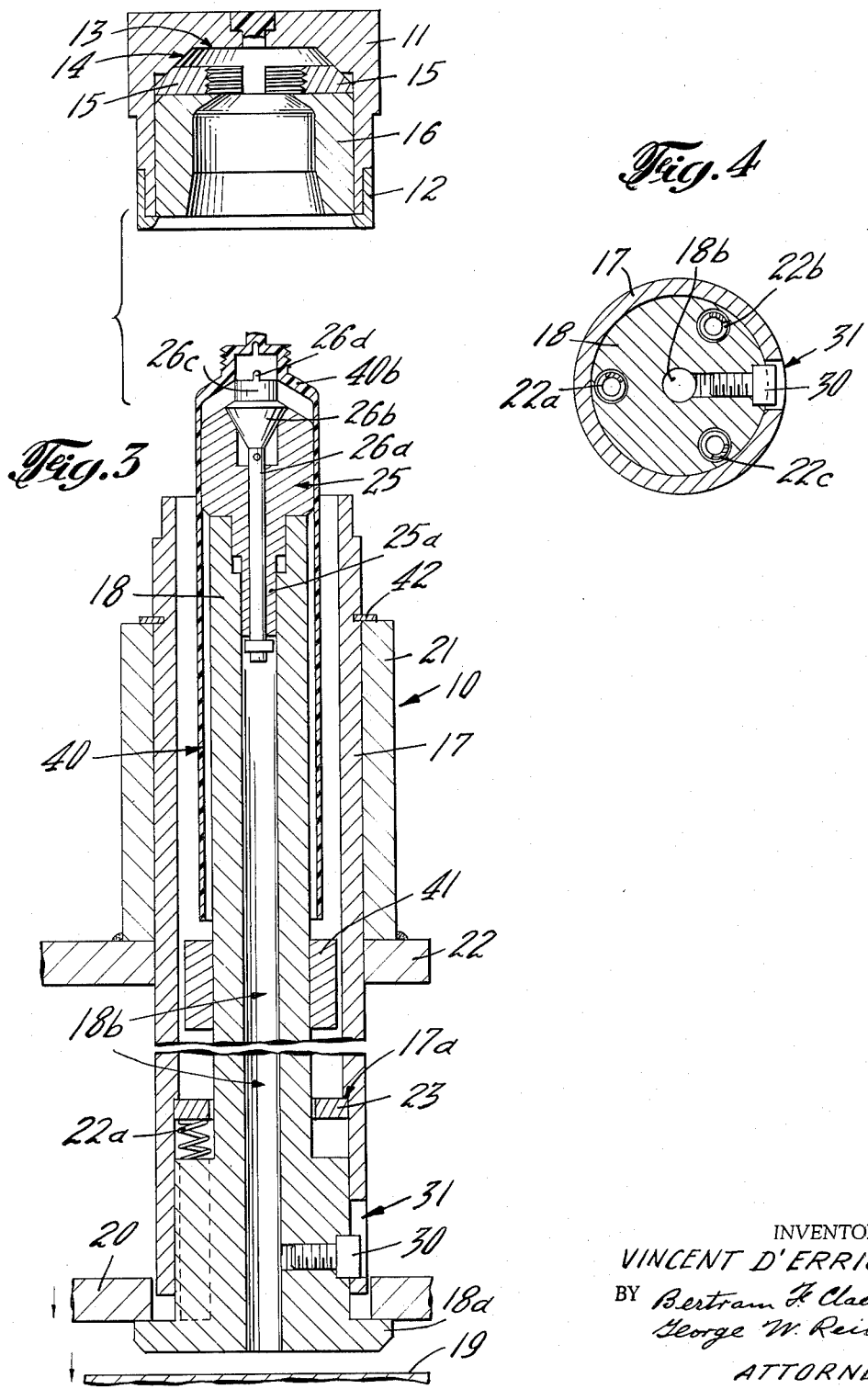
INVENTOR.
VINCENT D'ERRICO
BY Bertram F. Claeboe
George W. Reiber
ATTORNEYS

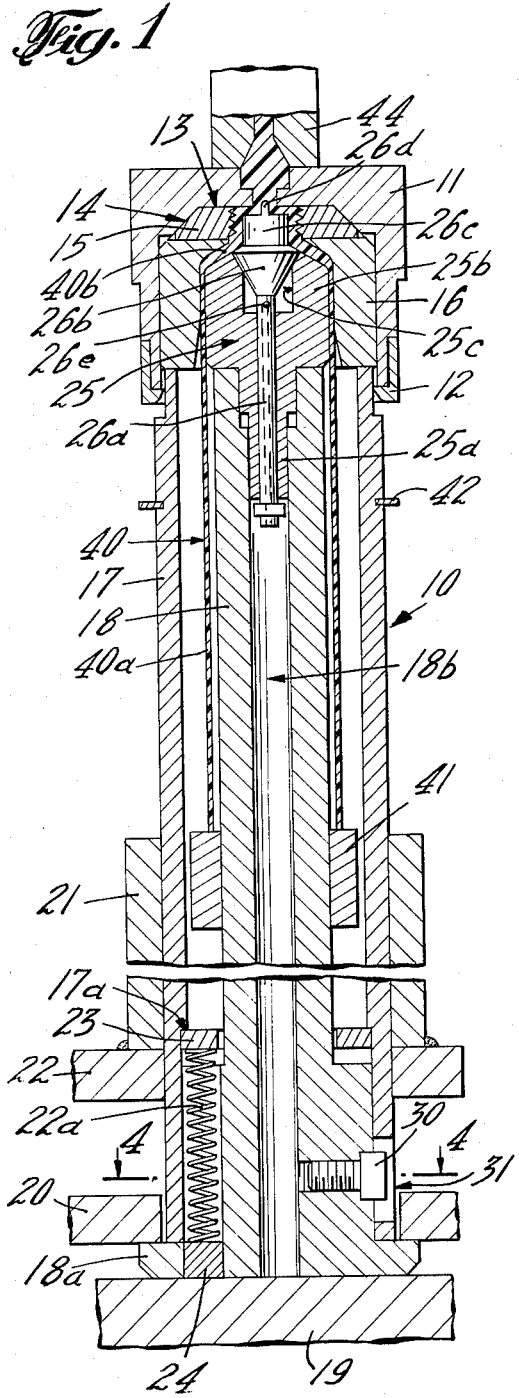
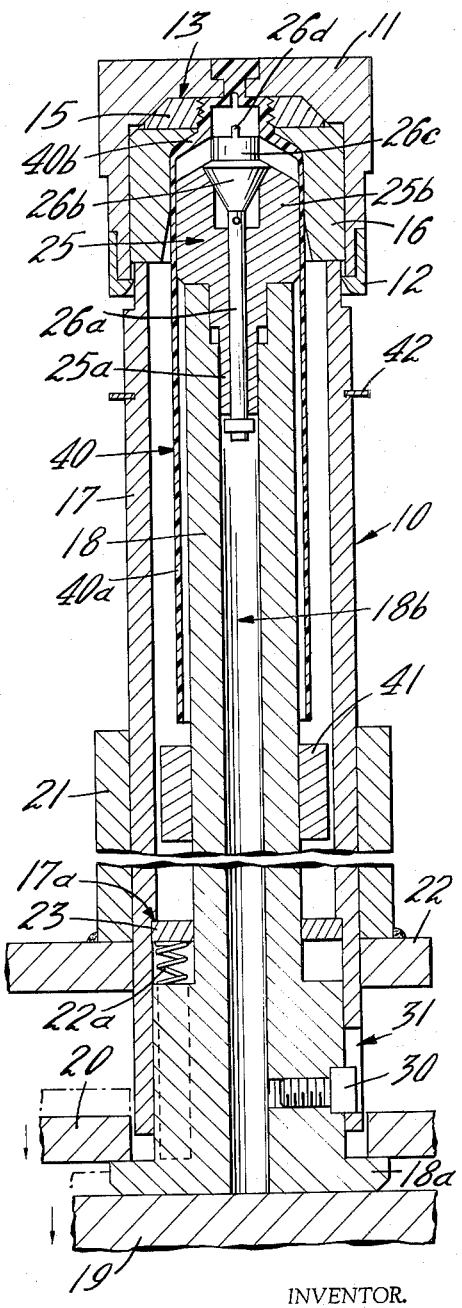

United States Patent Office 3,207,833
Patented Sept. 21, 1965

3,207,833
METHOD AND APPARATUS FOR MOLDING A HEADPIECE TO A PREFORMED TUBULAR BODY
Vincent D'Errico, Maynard, Mass., assignor to American Can Company, New York, N.Y., a corporation of New Jersey
Filed Nov. 23, 1962, Ser. No. 239,501
8 Claims. (Cl. 264—278)

The present invention relates broadly to a method and apparatus for molding and fusing a headpiece to a preformed tubular body, and is more particularly concerned with a tooling assembly of novel construction featuring rapid and effective sequential disengagement of a molded tubular article from internal and external forming members.

It is known to the art to fuse and form a headpiece upon a tubular thermoplastic sleeve to provide a collapsible dispensing container by introducing an internal forming member with sleeve thereon into a die cavity formed of separable mold members, and then injecting or otherwise introducing molten thermoplastic material into the confines of the cavity defined between the forming and mold members. After the thermoplastic material has set in formed and bonded relation upon the sleeve member, the mold members are separated from engagement with the headpiece, the internal forming member with container body thereon is lowered, and air introduced axially through the forming member for the purpose of ejecting the tube body from the internal former.

In many instances the ejection technique is completed successfully, however, in other cases it is virtually impossible to remove the tube body from the mandrel or internal forming member using an air blast as indicated, or even manual force in the nature of a twisting action. The principal causes for such tight adherence of the tube headpiece to the mandrel appear to be the substantial contraction which the thermoplastic material undergoes while cooling, and the fact that the air pressure is reduced in a multiple tool arrangement by reason of its escape from the air ejection openings of those mandrels from which the tube bodies have been properly discharged, leaving an inadequate air pressure for the tube bodies on the remaining mandrels. Quite clearly, in a production operation little time exists for manual attempts at the tube removal, and from time to time a mandrel with headed tube thereon is indexed back to the injection station and receives an extra charge of thermoplastic material. In many instances this causes jamming or clogging of the injection nozzle, and possible stoppage of the entire machine until the jammed condition can be rectified.

It is accordingly an important aim of the present invention to provide molding apparatus constructed in a novel manner to assure that tubular articles formed therewith will be rapidly and uniformly ejected therefrom upon completion of the molding operation.

Another object of this invention lies in the provision of forming apparatus for tubular articles comprises of internal and external forming members, and which features first disengaging the article from the internal former and thereafter rapidly removing the article from the external forming member.

Still another object of the instant invention is to provide molding apparatus of the foregoing character in which initial separation of the tubular article and mandrel or internal forming member is effected without dependence upon air ejection means.

A further object of this invention lies in the provision of forming apparatus for thermoplastic articles featuring an internal former for receiving a thermoplastic body thereon and an external former including separable mold parts for receiving the internal former to define therewith a cavity, the apparatus also embodying means for introducing thermoplastic material into the cavity to form and fuse a body portion upon the body, means for maintaining the separable mold parts in a first position while the body portion is being formed, and means for moving the internal former relative to the external former while the mold parts are maintained in the first position to withdraw the internal former from the body portion and for thereafter moving the maintaining means to move the mold parts to a second position and thereby release the body portion therefrom.

Other objects and advantages of the invention will become more apparent as the description proceeds, particularly when taken in connection with the accompanying drawings.

In the drawings, wherein like numerals are employed to designate like parts throughout the same:

FIGURE 1 is a vertical sectional view through forming apparatus constructed in accordance with the principles of this invention, and showing the relative positioning of parts during the injection molding operation;

FIGURE 2 is a view similar to FIGURE 1, but illustrating the position of the parts after withdrawal of the internal forming member from the molded body portion;

FIGURE 3 is likewise a similar view to those preceding, but showing the assembly after withdrawal of the molded body portion from the external forming member; and FIGURE 4 is a transverse sectional view taken substantially along the line 4—4 of FIGURE 1.

Referring now first to FIGURE 1 of the drawings, there is designated generally by the numeral 10 forming apparatus embodying the novel concepts of this invention. The apparatus comprises in the exemplary embodiment illustrated a stationary die housing 11 which may be formed of separable parts retained in position by ring member 12. The housing 11 is of generally an inverted cup shape and interiorly thereof is provided with a flat wall 13 and inclined walls 14 which receive external neck forming means 15 taking the form of a plurality of separable thread plates spring-pressed outwardly in a manner known to the art.

The resilient force urging the thread plates 15 outwardly is opposed by a collar member 16 retained within the die housing 11 by the ring member 12, the collar member being maintained in the position of FIGURE 1 by an outer movable sleeve member 17 which is seated upon flange portion 18a of inner movable sleeve member 18, supported by a lower movable plate member 19. Spaced above the plate member 19 is an upper movable plate member 20 engageable with the flange portion 18a on the inner sleeve member 18.

Surrounding the outer sleeve member 17 is an annular member 21 rigidly connected to a base plate member 22 which is suitably secured to fixed structure. The annular member 21 provides a guide support for the sleeve member 17 during the final portion of the stripping action (FIGURE 3), as will be later described, and prior thereto the outer sleeve 17 is maintained in firm supporting relation against the collar member 16 by provision of resilient means 22a–c (FIGURE 4) which bear at one end against washer means 23 and at their opposite ends against plug means 24 welded or otherwise secured in the inner sleeve member 18. As appears, the washer means 23 engages the outer sleeve member 17 by provision of a shoulder 17a on the inner diameter thereof.

The inner sleeve member 18 is axially passaged as at 18b and receives therein tubular stem portion 25a of internal shoulder former member 25, shown as also embodying an enlarged head portion 25b engageable with the upper end of the sleeve member 18. The noted members 18 and 25 are bolted or otherwise secured together so as to be movable in unison, and the member 25 provides support for an internal neck forming member 26 shaped with a hollow stem portion 26a, inverted frusto-conical intermediate portion 26b, and substantially cylindrical head portion 26c which mounts centrally thereof a relatively short length tip portion 26d. As is shown, the hollow stem portion 26a of the internal neck former 26 terminates in an opening 26e providing an air discharge orifice to facilitate ejection of the formed thermoplastic article upon completion of the step shown in FIGURE 3. In this regard, it should be noted that the forming member 26 is permitted limited axial movement relative to the internal shoulder former 25. Thus, the admission of air into the axial passage 18b in the internal sleeve and through the neck former stem 26a for discharge through the orifice 26e creates a pressure build-up in cavity 25c to raise the neck former 26 slightly. Conversely, the thermoplastic material is injected into the neck and shoulder forming cavity at sufficient pressures to maintain the neck former 26 in tight fitting relation with respect to the shoulder former 25.

The novel forming apparatus 10 of this invention further includes bolt means 30 threaded into the lower portion of the inner sleeve member 18 and having its head portion received in an axially extending slot 31 in the outer sleeve member 17 for a purpose which will presently appear. Additionally, the apparatus embodies an annular stop member 41 adjustably fixed in encircling relation upon the inner sleeve member 18 to provide a bottoming surface for proper positioning of a thermoplastic sleeve portion 40a of tube body 40 prior to and during fusing and forming a headpiece 40b thereon.

Further, in the instant apparatus 10 there is rigidly mounted upon the outer sleeve member 17 adjacent its upper end a ring member 42 to limit downward travel of the sleeve member 17 during the final separation of parts, shown in FIGURE 3. Also, as appears in FIGURE 1, molten thermoplastic material from a suitable source is injected into the neck and shoulder forming cavity by nozzle means 44.

The operation of the forming apparatus 10 may be described as follows. The thermoplastic sleeve portion 40a is located upon the inner shoulder forming member 25 and against the annular stop 41 by first lowering the upper and lower movable plate members 20 and 19 a sufficient extent so that bolt means 30 contacts the lower end of the slot 31, forcing the outer movable sleeve member 18 to make a corresponding descent to the approximate position of FIGURE 3, whereat there is sufficient space to load the thermoplastic sleeve 40a upon the inner shoulder forming member 25 and against the stop member 41 to a position such that a small annular band at the upper end of the sleeve extends beyond the shoulder member 25, so as to provide a sufficient area for bonding contact with the headpiece material.

The parts are then moved to the position of FIGURE 1 with the inner shoulder former 25 within the collar member 16 and the outer sleeve member abutting the collar 16, which causes the thread plates to close. Injection of thermoplastic material from the nozzle member 44 then takes place to provide, upon cooling, a headpiece 40b intimately fused to the upper portion of the thermoplastic sleeve 40a producing the final article 40.

To eject the article 40 from the apparatus 10, essentially a two-step process is employed, followed if desired by an air discharge. In brief, first the male tooling is freed from the headpiece 40b while said headpiece is retained in the female tooling, and thereafter the latter tooling is released to free the headpiece 40b therefrom.

The first step can be seen by comparative reference to FIGURES 1 and 2 and is initiated after formation of the article 40 by causing the upper and lower movable plate members 20 and 19 to descend under the action of hydraulic or pneumatic means or the like (not shown). The plate members 19 and 20 move essentially simultaneously, and by reason of the contact between plate 20 and flange portion 18a on the inner sleeve member 18, the latter member makes an axial descent from the position of FIGURE 1 to that of FIGURE 2, carrying with it the inner neck and shoulder forming members 25 and 26 to release them from the tube headpiece 40b.

During the described initial movement, the outer sleeve member 17 is maintained in its uppermost position of FIGURES 1 and 2 by action of the spring means 22a–c bearing against the washer means 23 and plug means 24. Accordingly, the thread plates or outer neck forming means 15 are held in closed position against flat wall 13 of the die housing 11, whereby the formed headpiece 40b is clamped and held against movement while the male tooling is being withdrawn. However, when the bolt means 30 on the inner sleeve 18 bottoms in the slot 31 in the outer sleeve 17, continued movement of the plate members 19 and 20 opposes the spring means 22 and forces descent of the outer sleeve 17. This removes the upward support on the thread plates 15, whereby the spring forces therein cause them to slide along the sloping walls 14 of the die housing 11 until they reach the open position of FIGURE 3.

Such action constitutes what may be regarded as the second step or phase of the ejection process, since with the thread plates 15 open, continued descent of the plate members 19 and 20 and sleeve members 17 and 18 completely frees the formed article from the female tooling. The outer sleeve member 17 then further moves downwardly until the retaining ring 42 thereon contacts the upper end of the fixed support 21, and thereafter if desired, air may be discharged from the orifice 26 to completely eject the formed article 40 from the forming apparatus 10. Of course, hand removal may be employed and can readily be accomplished if the cycle time permits since, as seen in FIGURE 3, the formed article has been essentially completely freed from the inner neck forming member 26, which is the region whereat problems of removal have been experienced in the past.

The rapid and effective means provided by applicant for separating a formed article first from male tooling and then from female tooling has been described in connection with thermoplastic tubular containers, although it is believed quite apparent from the foregoing that the apparatus is not limited thereto. Further, the invention is not restricted to an injection molding procedure, but may be employed in connection with compression molding or other techniques, and the thermoplastic material could as well be introduced into the cavity in powdered or granular form and be rendered molten therein. These and other changes to the method and apparatus can of course be effected without departing from the novel concepts of the present invention.

I claim:
1. A method of molding and fusing a headpiece to a preformed tubular body comprising the steps of:
    positioning a preformed tube body on a male forming member;
    placing said body and said male forming member within an external forming member comprising engaged separable female mold parts, said male and external forming members defining a mold cavity;
    introducing a quantity of molten thermoplastic material into said mold cavity thereby forming a headpiece fused to said tube body;
    cooling said thermoplastic headpiece fused to said body;
    partially withdrawing said male member from said headpiece while maintaining said separable female mold parts about said headpiece;
    thereafter separating said engaged female mold parts from about said headpiece;
    and then completely removing the headed tube from said male member.

2. A method as defined in claim 1, in which during separation of the female mold parts said tube body is supported in part by said male member and is thereafter completely ejected therefrom.

3. Apparatus for forming a thermoplastic headpiece on a preformed tube, comprising an internal forming member, an external forming member including separable mold parts for receiving said internal forming member to define therewith a cavity for the reception of thermoplastic material, an inner pusher member for locating said internal forming member relative to said mold parts, an outer pusher member for supporting said mold parts in closed position during the molding of said material and the forming of said headpiece therefrom, means maintaining said outer pusher member in supporting relation to said mold parts, and means for first moving said inner pusher member slightly away from and free from said headpiece while said mold parts are maintained in closed position by said outer pusher to partially withdraw said internal forming member from said preformed tube and for then moving said outer pusher member in opposition to said maintaining means to open said mold parts to release said article therefrom.

4. Forming apparatus of the character defined in claim 3, in which said inner pusher member is telescopingly received in said outer pusher member, and in which said inner pusher and said internal forming member having fluid discharge passages therein to permit complete ejection of the shaped article after it has been released from said mold parts.

5. Forming apparatus of the character defined in claim 3, in which the maintaining means are spring means urging said inner and outer pusher members in opposite axial directions, and in which there is also provided cooperating means on said inner and outer pusher members limiting the first movement of said inner pusher and causing said maintaining means to be opposed.

6. Forming apparatus of the character defined in claim 5, in which the cooperating means includes bolt means in said inner pusher member received in a relatively short length axial slot in said outer pusher member, and in which said outer pusher is caused to move in opposition to said spring means when said bolt means bottoms in said slot.

7. Apparatus for molding and fusing a headpiece to a preformed tubular body, comprising:
    a separable female forming member;
    a male forming member movable relative to said female member and cooperating with said female member to define a mold cavity therebetween when said male and female members are in a closed position;
    means for maintaining said forming members in said closed position;
    means for introducing a quantity of molten thermoplastic into said mold cavity to form said headpiece;
    means for first freeing said male forming member from said headpiece and partially withdrawing said male member from said tube body, while said separable female members are maintained closed;
    and means for thereafter separating said closed separable female member to free said headpiece therefrom.

8. The apparatus of claim 7 wherein said male forming member has a fluid discharge passage therein to permit ejection of the headed tube from said male member after said headpiece is freed from said separable female member.

References Cited by the Examiner
UNITED STATES PATENTS

| | | |
|---|---|---|
| 2,883,706 | 4/59 | Quinche et al. |
| 3,020,594 | 2/62 | Makowski. |
| 3,109,198 | 11/63 | Guignard. |

ALEXANDER H. BRODMERKEL, *Primary Examiner.*